US006912271B1

(12) United States Patent
Tuttle

(10) Patent No.: US 6,912,271 B1
(45) Date of Patent: Jun. 28, 2005

(54) PERSONALIZED RECORDED MESSAGE VIA MESSAGE DELIVERY SYSTEM

(75) Inventor: Robert J. Tuttle, Ormond Beach, FL (US)

(73) Assignee: The Broadcast Team Inc., Ormond Beach, FL (US)

( * ) Notice: Subject to any disclaimer, the term of this patent is extended or adjusted under 35 U.S.C. 154(b) by 412 days.

(21) Appl. No.: 09/805,064

(22) Filed: Mar. 13, 2001

Related U.S. Application Data

(63) Continuation-in-part of application No. 09/124,697, filed on Jul. 29, 1998.
(60) Provisional application No. 60/189,308, filed on Mar. 14, 2000, and provisional application No. 60/079,454, filed on Mar. 26, 1998.

(51) Int. Cl.[7] .............................................. H04M 1/64
(52) U.S. Cl. ................... 379/69; 379/88.22; 379/88.28; 379/88.25
(58) Field of Search ........................... 379/67.1, 69, 70, 379/88.16–88.25, 51, 355.01–355.1

(56) References Cited

U.S. PATENT DOCUMENTS

| | | | |
|---|---|---|---|
| 4,356,348 A | 10/1982 | Smith ...................... 179/1 MN |
| 4,539,436 A | 9/1985 | Theis .......................... 179/6.04 |
| 4,667,065 A | 5/1987 | Bangerter .................... 379/351 |
| 4,692,817 A | 9/1987 | Theis ........................... 360/12 |
| 4,941,168 A | 7/1990 | Kelly, Jr. ..................... 379/69 |
| 5,185,787 A | * 2/1993 | Katz ...................... 379/204.01 |
| 5,371,787 A | 12/1994 | Hamilton .................... 379/386 |
| 5,404,400 A | 4/1995 | Hamilton .................... 379/386 |
| 5,430,792 A | 7/1995 | Jesurum ....................... 379/67 |
| 5,444,767 A | 8/1995 | Goetcheus ................... 379/67 |
| 5,559,867 A | * 9/1996 | Langsenkamp et al. ....... 379/69 |
| 5,581,602 A | 12/1996 | Szlam .......................... 379/67 |
| 5,644,624 A | * 7/1997 | Caldwell ...................... 379/69 |
| 5,644,625 A | 7/1997 | Solot ............................ 379/88 |
| 5,652,784 A | 7/1997 | Blen ............................ 379/67 |
| 5,724,420 A | 3/1998 | Torgrim ...................... 379/372 |
| 5,768,358 A | 6/1998 | Venier ........................ 379/207 |
| 5,787,151 A | 7/1998 | Nakatsu ....................... 379/67 |
| 5,799,066 A | * 8/1998 | Joyce et al. .............. 379/88.04 |
| 5,828,731 A | * 10/1998 | Szlam et al. .............. 379/88.16 |
| 5,901,214 A | 5/1999 | Shaffer ....................... 379/220 |
| 5,943,410 A | * 8/1999 | Shaffer et al. ......... 379/213.01 |
| 6,041,116 A | * 3/2000 | Meyers ....................... 379/244 |
| 6,067,348 A | * 5/2000 | Hibbeler .................. 379/88.16 |
| 6,208,970 B1 | * 3/2001 | Ramanan .................... 704/270 |
| 6,226,360 B1 | * 5/2001 | Goldberg et al. ............. 379/69 |
| 6,269,151 B1 | * 7/2001 | Hanson ....................... 379/69 |
| 6,470,077 B1 | * 10/2002 | Chan ...................... 379/88.01 |

* cited by examiner

Primary Examiner—Fan Tsang
Assistant Examiner—Joseph T Phan
(74) Attorney, Agent, or Firm—Brian S. Steinberger; Law Offices of Brian S. Steinberger, P.A.

(57) ABSTRACT

Message delivery system primarily for answering machines which provides a realistic sounding recorded message containing an individualized personal greeting which can be delivered onto one or more answering machines. This automated method of delivering a recorded personalized information message via an automated dialing system to automated recorders involves a series of steps of: forming a database of first names, determining frequency of occurrence of greatest number of the first names in the database; recording individual personal greetings to the first names having the greatest frequency of occurrence and, playing the individualized personally greeting without truncation onto answering machines associated with the first names having the greatest frequency of occurrence. This system provides a preliminary personalized greeting to the beginning of the generic message being delivered so that the recipient believes the message is coming from a real person.

5 Claims, 12 Drawing Sheets

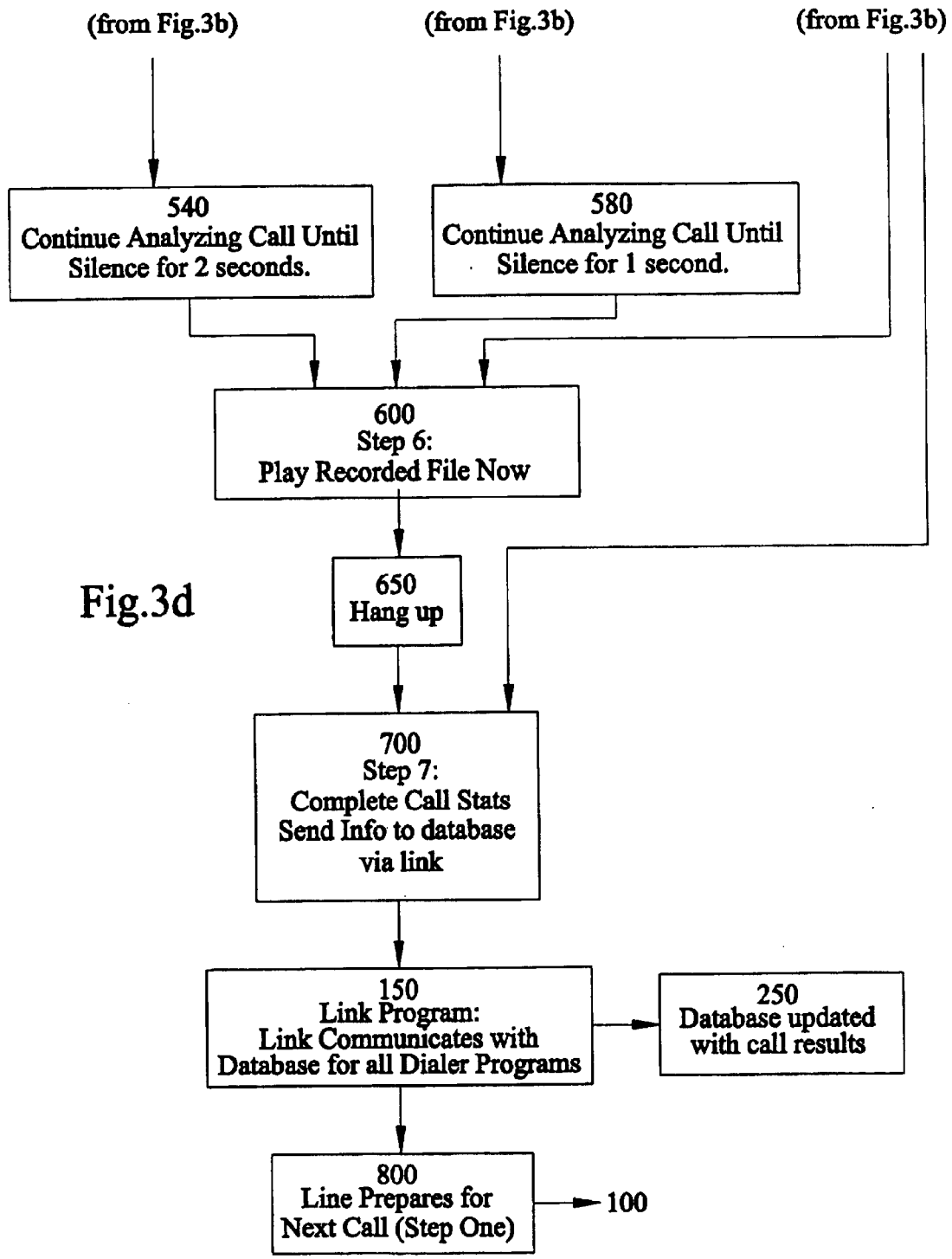

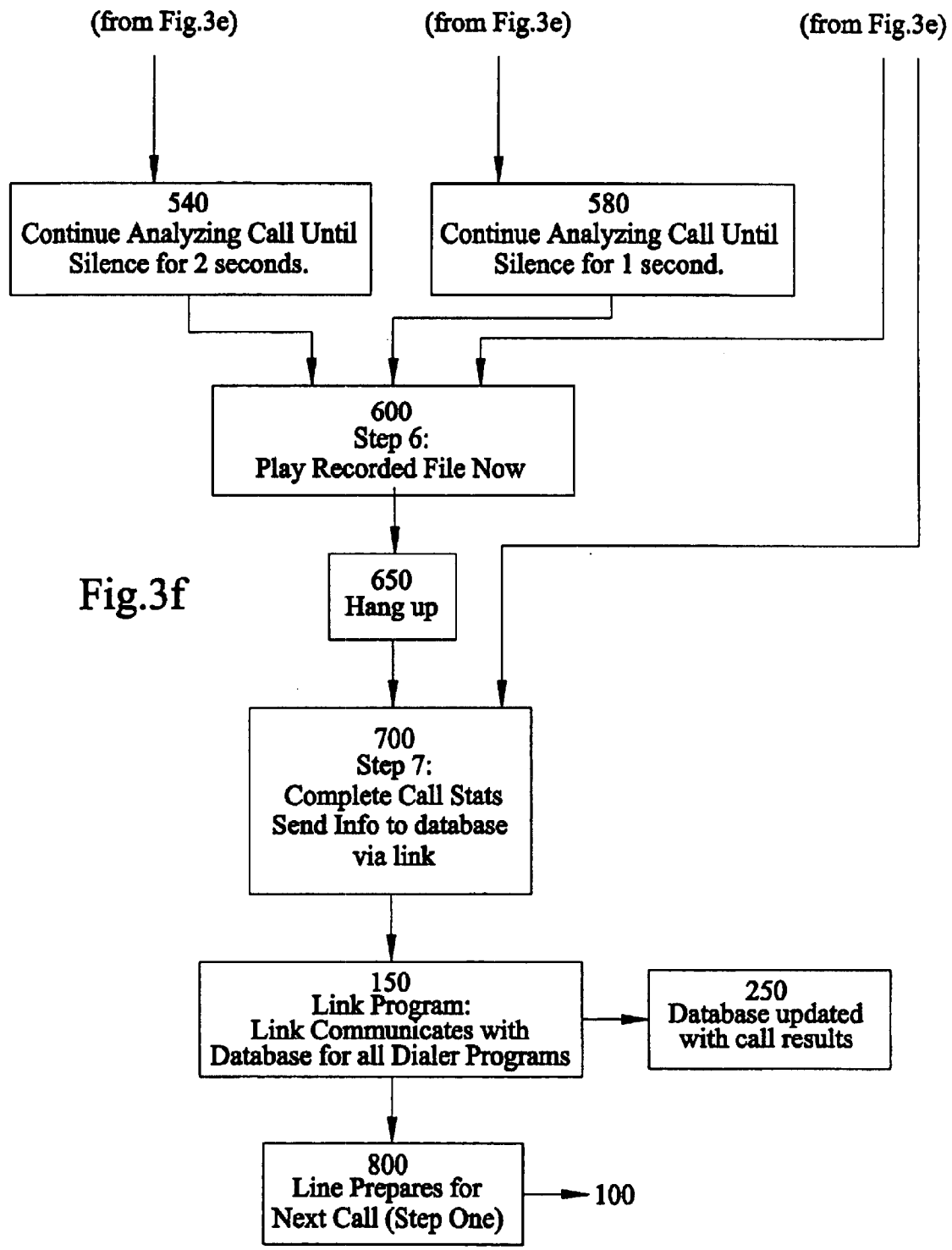

Fig.4

Market Ability  
9 Sunshine Blvd  
Ormond Beach, FL 32174

(904) 676-1520  
fax (904) 676-1127

RealCall Recap for HBO Free Preview - Phoenix  
4/6/98 11:31:49 AM

| | | |
|---|---|---|
| Total Database Records | 33083 | |
| Total Call Attempts | 37887 | |

| | | Database Connection | |
|---|---|---|---|
| Total Connections: | 27259 | 82.40% | |
| Answering Machines | 17930 | 54.20% | 65.78% |
| Human Answers | 9329 | 28.20% | 31.22% |
| Busy | 183 | 0.55% | |
| No Answer | 0 | 0.00% | |
| No Ring | 51 | 0.51% | |
| Operator Intercept | 3473 | 10.50% | |
| Time Out | 2043 | 6.18% | |
| Fax Tone | 64 | 0.19% | |

Call Details:

Unreachable Records     3500        10.85%  
  Fax tone, No ring, Operator intercept Retryable Records      2226         6.73%  
  Reason: Busy + No Answer + Time Out Live Connection Stats:

Number of live connections: 9329  
Length of voice file(s): 30

| Length of call (secs) | Number of connects | |
|---|---|---|
| 0 - 10 | 362 | 3.00 % |
| 11 - 20 | 1481 | 15.88% |
| 21 - 25 | 448 | 4.8% |
| 26 - 30 | 7038 | 75.44% |

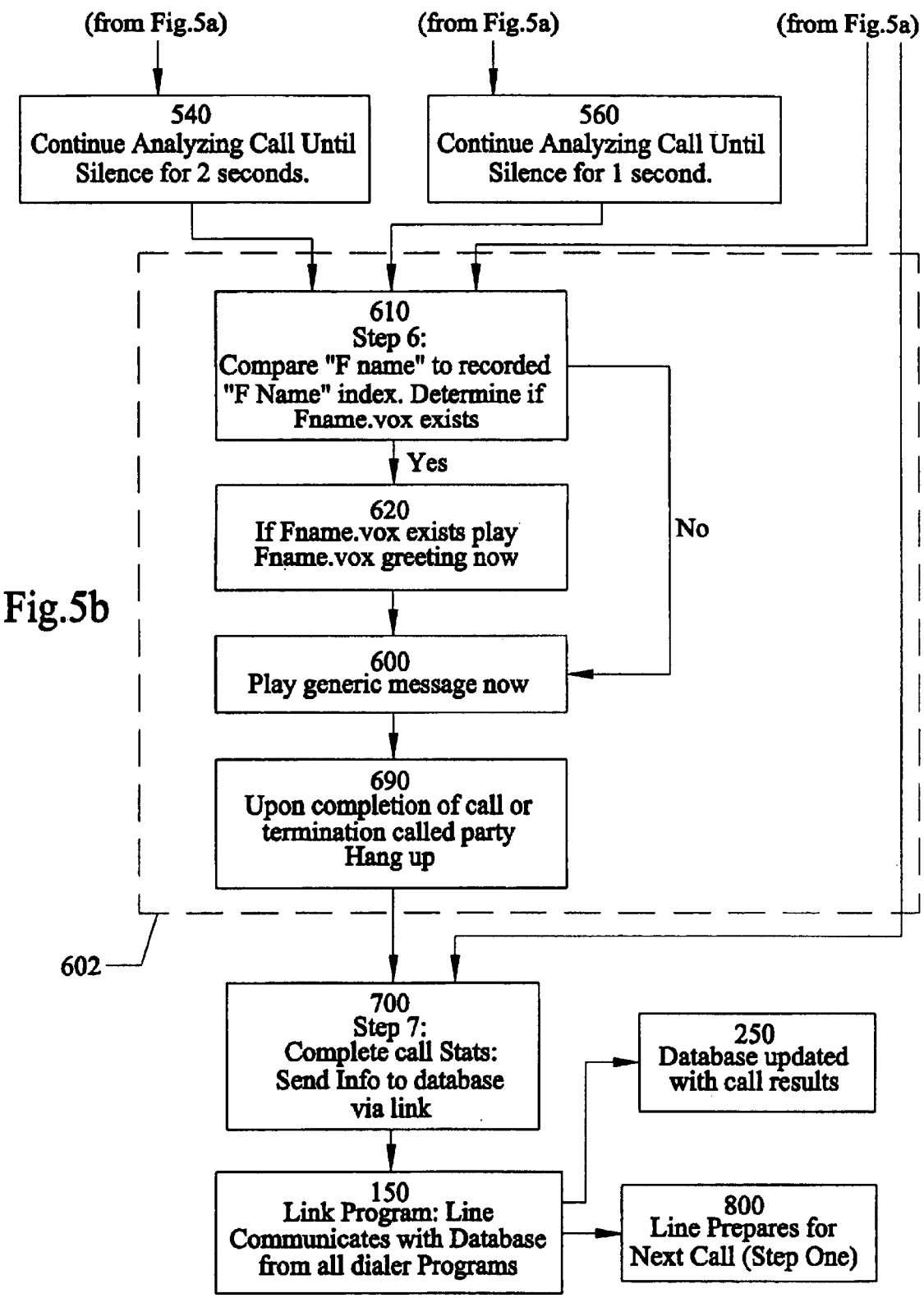

PERSONALIZED RECORDED MESSAGE VIA MESSAGE DELIVERY SYSTEM

This invention relates to telephone answering systems, and in particular to personalizing recorded messages with personalized greetings to the individual being called, and is a Continuation-In-Part of U.S. application Ser. No. 09/124,697 filed on Jul. 29, 1998 which claims the benefit of U.S. Provisional Patent Application 60/079,454 filed on Mar. 26, 1998 and further claims the benefit of U.S. Provisional Patent Application No. 60/189,308 filed Mar. 14, 2000 by the same assignee and the same inventors of the subject invention.

BACKGROUND AND PRIOR ART

Communicating messages by telephone has increased tremendously in the past decade. Communicating information such as advertisements and public announcements has become very important. Leaving pre-recorded messages has become a popular technique for communicating information by telemarketers to thousands of individuals and businesses. Telemarketers generally attempt to deliver pre-recorded information messages by telephone to live consumers and to answering machines. However, telemarketers have many problems associated with leaving pre-recorded messages. For example, many pre-recorded messages are not taken seriously because the recipients usually know that the message was pre-recorded. Furthermore, the pre-recorded messages are not correctly received by the answering machines. For example, the machine may turn on after a pre-recorded message has begun playing. Thus, it has become more popular than ever for the telemarketers to use computers which will detect conditions that an answering machine is receiving the call so that the call can be dropped(hung up). See for example: U.S. Pat. No. 4,356,348 to Smith. These dropped calls can be quite significant when considering the number of answering machines and undelivered information messages that occur.

Attempts have been made over the years to overcome the problems with delivering messages to telephone answering machines. See for example U.S. Pat. No. : 4,667,065 to Bangerter; U.S. Pat. No. 4,941,168 to Kelly, Jr.; U.S. Pat. No. 5,371,787 to Hamilton; U.S. Pat. No. 5,430,792 to Jesurum et al.; and U.S. Pat. No. 5,581,602 to Szlam et al. However, these patents are generally limited to sensing audio signals generated by the answering machines for the purpose of determining that the call has connected to a machine, (as opposed to a call that connects to a live person) and do not address the problem of when to begin playback of an outgoing recorded message to insure that it is recorded in its' entirety by the answering device. Many existing devices designed to deliver a prerecorded message to an answering device commence playing a recorded message based on mistakenly detecting when the "beep" has occurred. Recognizing a "commence recording now beep" signal is a common problem for both automated systems and real callers trying to leave messages on answering machines. Furthermore, these patents do not fully analyze the connected calls in order to utilize preselected delay times to deliver and play recorded messages.

Message delivery systems which deliver a recorded message to an answering machine must solve the problem of determining when to "Launch"(begin playback of) the pre-recorded message. Conventional systems rely on a timer to determine the moment to begin playback of the recorded message. Typically the timer is initiated once the determination has been made that the call has been answered by a machine. Message delivery systems which rely on timed delivery experience a high percentage of truncation of the recorded message being delivered. This is a result of the system beginning playback of the recorded message BEFORE the answering machine starts recording.

Another serious problem with timer based systems is that many answering machines will "hang up" on the system before the message launches. This is due to a "vox" function in many answering machines which allows them to stop recording after they detect several seconds of continuous silence. If a timer based system waits too long before launching the message, the called answering machine may have already hung up before the message playback begins.

Additional problems also exist with sending pre-recorded messages. Often the persons being called will not listen to the recorded message since the message is generic and artificial sounding in nature. For example, pre-recorded messages generally do not personally address the individuals being called. Thus, the person receiving the generic message knows it was a pre-recorded message and either hangs up or ignores the substance of the message being delivered. Thus, sending the pre-recorded message can often be wasted. Ignoring important messages is not good when the message may be dealing with imminent dangerous weather conditions and other imminent dangers, and the like.

Other patents of interest include, U.S. Pat. No. 5,404,400 to Hamilton; U.S. Pat. No. 5,444,767 to Goetcheus et al.; U.S. Pat. No. 5,652,784 to Blen et al.; and U.S. Pat. No. 5,787,151 to Nakatsu et al. However, none of these patents solve all of the above problems.

SUMMARY OF THE INVENTION

The primary object of this invention is to provide a computer based system of delivering personalized pre-recorded messages to individuals with individualized greetings.

The secondary object of this invention is to contact a list of persons to be called and deliver pre-recorded personalized individualized greetings to most of the persons on the list and deliver a generic message to the remaining persons on the list.

The third objective of the present invention is to provide a computer based system capable of accurately interpreting an answering machine's playback condition so as to deliver prerecorded messages in their entirety(without truncation) onto the answering machine.

The fourth object of this invention is to provide a system for delivering prerecorded messages onto answering machines to insure the message sounds realistic(non recorded), in that the message is delivered very shortly AFTER the answering machine begins recording.

The fifth object of this invention is to provide a telephone dialing software message delivery system that overcomes leaving messages on machines based on a false "beep" signal.

The sixth object of this invention is to provide a system for delivering prerecorded individualized personal greetings onto an answering machine very shortly after the machine begins recording.

The invention encompasses two embodiments. The first embodiment encompasses delivering pre-recorded personalized greeting messages. A database includes approximately ⅔ of all the first surnames used by most people. The invention before calling a location checks the name on the location to be called against the database to see if a first surname exists. If the surname exists in the database, the invention takes a pre-recorded greeting associated with the stored surname and sends the recorded greeting as a preface in front of the recorded message being delivered. If the surname does not exist in the database, the invention only delivers the recorded message.

The second embodiment encompasses using the RealCall invention of the parent invention U.S. application Ser. No. 09/124,697 to the same assignee and same inventor as the subject application, which is incorporated by reference, for delivering pre-recorded personalized greeting messages after an answering machine has been detected and launches the pre-recorded personalized greeting followed by the recorded message. RealCall replaces the pre-set timer controls of the prior art devices with an "interactive" logic, where the invention "listens" to the answering machine's outgoing message and waits for a condition suggesting that the answering machine is in "record" mode. RealCall tests for the "record" mode condition by continuing to "listen" to the call for confirmation before starting to launch. As a result, the time interval from the moment the call connects until RealCall "launches" a message is different for each call placed by the RealCall system. The novel RealCall invention is a next level that comes into play after the system has detected whether the received call in the dialer system has reached a live person or an answering machine. Such a system is described in reference to U.S. Pat. No. 5,371,787 to Hamilton, which is incorporated by reference. The RealCall portion of the invention uses dual two tier steps after determining an answering machine has been reached. One two tier approach determines if a solid, i.e. audibly distinct, non-human tone of at least one second duration is detected in the connected call and then playing the recorded information message after the tone has ended for at least two seconds. The other two tier approach determines if silence of at least two seconds is detected is in the connected call and then playing the recorded information message after another second of silence has been detected. The system allows for the recording of a complete pre-selected message in a nontruncated form onto the answering machine within approximately two to three seconds of the start of the answering machine's recording step without allowing the machine to cut-off during the recording the complete pre-selected message, so that a user of the answering machine playing the complete pre-selected message believes a human and not a machine initiated the realistic recording. Unlike the limitations in the prior art systems, the novel invention can be used with all types of answering machines such as but not limited to a tape machine, a digital machine, a pager, a telephone provider voice/memory call machine, and a cellular machine.

The first and second embodiments can be combined together so that the RealCall system works in conjunction with delivering personalized greetings to the person being called.

Further objects and advantages of this invention will be apparent from the following detailed description of a presently preferred embodiment which is illustrated schematically in the accompanying drawings.

BRIEF DESCRIPTION OF THE FIGURES

FIGS. 3b and 3d, are a flowchart of the dialer placing call and monitoring portion steps 5–7 of the novel telephone dialing software message delivery system invention of FIG. 2.

FIGS. 3c and 3e and 3f, are an overview of the entire flowchart process of the novel telephone dialing software message delivery system invention of FIGS. 2 and 3A-3d.

FIG. 4 shows an exemplary output Recap form of the RealCall invention.

FIGS. 5a and 5b is a second embodiment flowchart of modifying the play the recording step 6, 600 of the first embodiment for personalizing a pre-face message to the pre-recorded message.

DESCRIPTION OF THE PREFERRED EMBODIMENT

Figure 1:
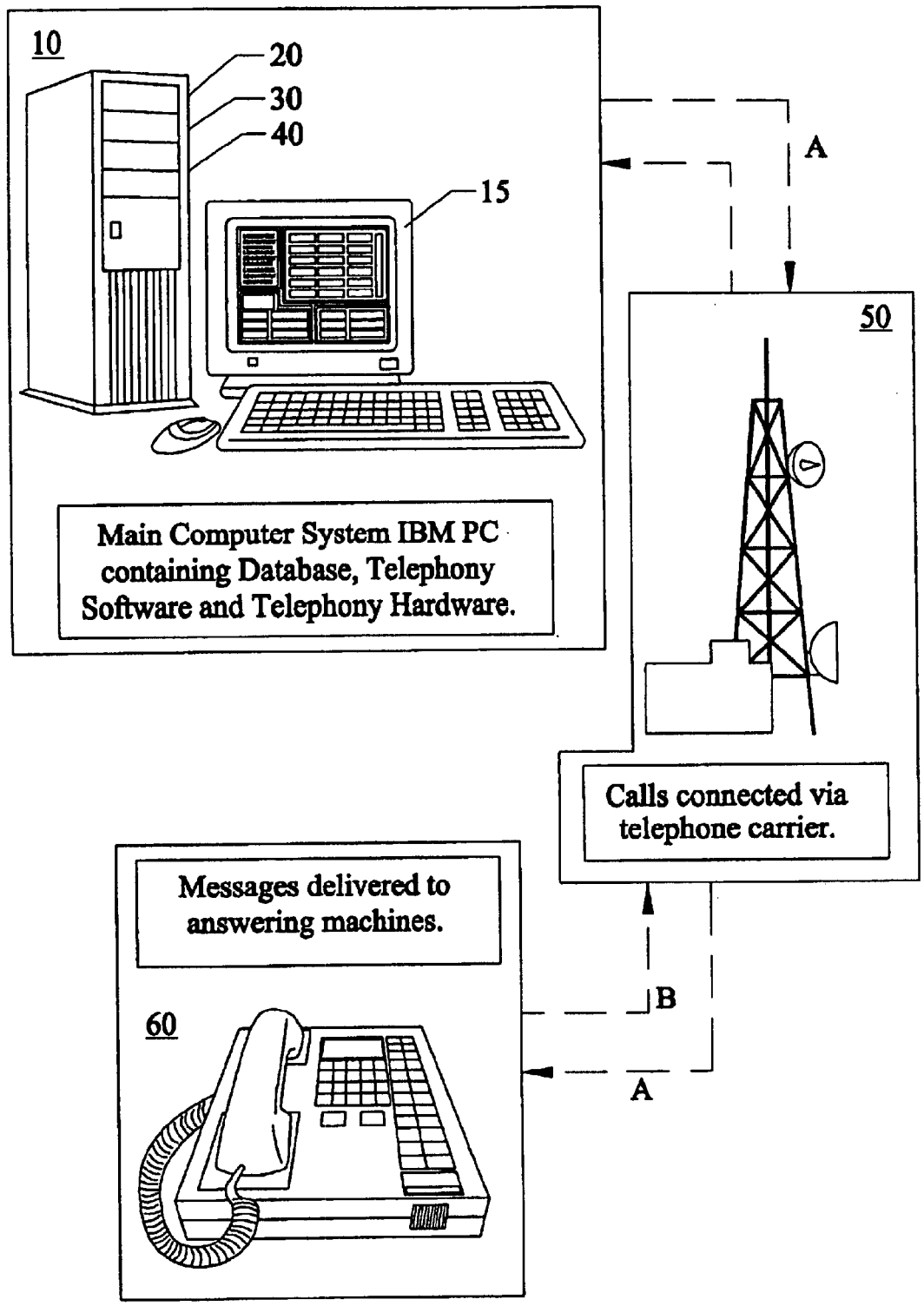
FIG. 1 illustrates a preferred setup of using the novel telephone dialing software message delivery system invention.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.
First Embodiment FIG. 1 illustrates a preferred setup of using the novel telephone dialing software message delivery system invention. Referring to FIG. 1, the invention, includes a main computer system 10 connected to a telephone carrier 50 which in turn is connected to remotely located answering machines 60. Main computer system 10 includes a PC 15 such as an IBM compatible PC having 200 MHZ or higher, with Pentium processor and the like, including a standard harddrive, 14" or greater color monitor, mouse and keyboard for input. PC 15 is connected to a Telephony Hardware 20 such as but not limited to an Analog/Digital Multi Channel Telephony card such as the Dialogic D41D(Analog), D240SC-T1 and D/240SC-T2(Digital), and the like. The telephone CT hardware 20 can be a 12" computer card used in the computer 10 and includes the following features of playing voice messages to a caller, digitizing and recording voice signals, connecting directly to telephone lines, and placing outbound calls and reporting the results of the calls. The Dialogic Computer Telephony(CT) card model no. D/240SC-T1 and D/240SC-T2 can allow twenty-four(24) telephone lines to operate through a single phone line. The software 30 uses multitasking OS(Windows 2000 or Windows NT and the like), and can be developed with programming language software such as but not limited to C++, Visual Basic, Delphi, and the like. Software 30 further uses a Custom Control software for control of the CT hardware 20. Programming languages(i.e. Microsoft's Visual Basic) provide a conduit for programmers to access a computers built in capabilities. Programming languages refer to code which accesses specific capabilities, such as viewing the contents of a hard drive, playing sound files over a computer's sound card as CONTROLs. The Custom Control software 30 are controls which are not provided part of the programming language, but are typically developed by third party software developers.

The software 30 further uses database software for maintaining the calling lists, such as but not limited to Microsoft Sequel Server, Dbase, Foxpro, and the like. The calling lists in the RealCall invention contain at least the following: phone number(approximately 10 digits), geographic area indicator (such as ZIP code), message file name(s), call history field, connect time field, record number(unique), date and time of call, and last call status. Although not required, the calling lists can contain additional information such as but not limited to names, addresses, past consumer behavior, and the like.

Along with the telephony CT hardware 20 and software 30 is the telephone service 40 such as but not limited to Analog(RJ11–RJ14) interface, Digital(T1) interface and the like, which comes from the telephone service provider. The telephone service provider, such as but not limited to BellSouth and MCI, provides access to the network of telephone lines linking all telephones across the United States.

A telephone carrier 50 connects automatically dialed calls A from main computer system 10 to deliver messages to the remotely located answering machines 60, and the CT hardware 20 monitors the call status B. For example, BellSouth can provide a "Dial Tone" service, (which can be required by some CT hardware) and MCI can provide digital T1 service (no dial tone).

Both BellSouth and MCI can provide a "Switching" capability, wherein each call can be routed over any available wire network to deliver the call to the appropriate telephone.

The RealCall invention of U.S. application Ser. No. 09/124,697 to the same inventor and same assignee as the subject invention, which is incorporated by reference, can successfully interpret both traditional answering machines (tape and digital) as well as answering services such as but not limited to BellSouth "Personal Voice Mail" and "Memory Call" as well as cellular phone answering services such as "Mobile Memo" and pager messaging services. The RealCall invention can work with any answering system which plays a voice message and then records the callers message.

Figure 2:
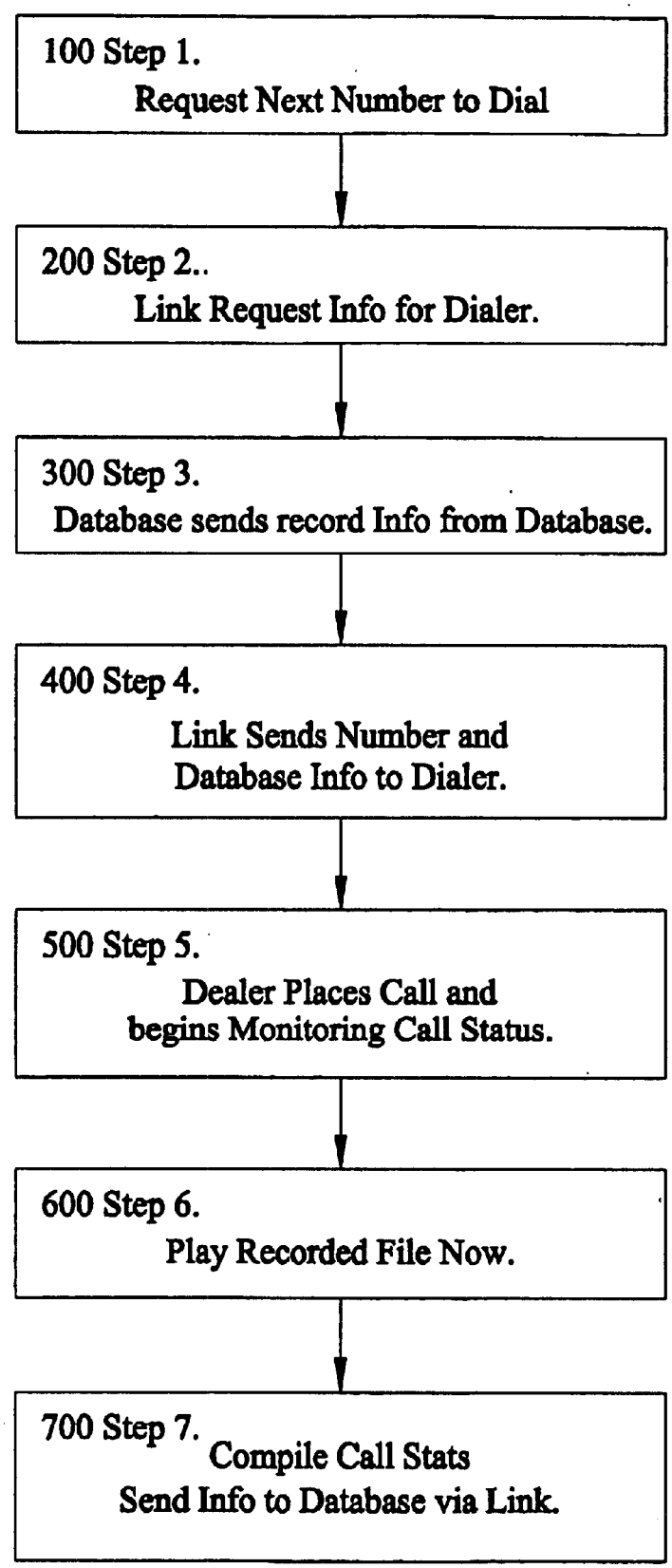
FIG. 2 is a chart of the seven(7) steps used in the novel telephone dialing software message delivery system invention of FIG. 1.

FIG. 2 is a chart 7 of the seven (7) steps used in the novel telephone dialing software message delivery system invention of FIG. 1. The seven (7) steps cover the interaction between a novel dialer program and a link program, which is shown in greater detail in reference to FIGS. 3A-3C. The first four steps can be accomplished by the Dialogic systems covered under U.S. Pat. No. : 5,371,787(machine answer detection); U.S. Pat. Nos. 5,638,436 & 5,450,484(voice detection); U.S. Pat. No. 4,979,214(speech recognition); U.S. Pat. No. 5,404,400(outcalling apparatus) and U.S Pat. No. 5,764,759, all of which are incorporated by reference. Other dialing systems can be used which initially determine when an answering machine has been detected through step 400.

An overview of the seven (7) steps will now be described. Referring to FIGS. 1 and 2, the first Step 100, the Dialer program requests the next (telephone) number to be dialed from the "Link program" which has access to the calling database in the main computer 10. The "dialer" step 100 is responsible for dialing a telephone number, determining the status of the call and delivering the recorded message at an appropriate time. For example, each phone line is monitored by the Dialer program step.

In the second Step 200 the link requests info for the dialer step from a database of phone numbers. A novel Link program insures that individual phone numbers are dialed only once. The Link program is the only program, which communicates with the database of phone numbers directly. Each dialer program submits requests for new phone numbers to the Link, which processes these requests in the order, received and retrieves information from the database of phone numbers on behalf of each dialer program. In addition, the Link program updates the database with completed call statistics, which are communicated to the Link program from each Dialer program as calls are completed. The purpose of the Link program is to avoid system resource problems which can occur when hundreds of Dialer programs attempt to simultaneously communicate with a database directly. Third Step 300 has the database send record info from the database to the Link. And the Fourth Step 400 sends the database Info to the dialer.

The subject invention novelty comes into play with the Fifth Step 500 in FIG. 2. Fifth Step 500 has the dialer place the call and begins monitoring call status. The call status can include whether the call connected to an answering machine, busy signal, reached a Facsimile tone, no answer, and the like. Sixth Step 600 plays the recorded file, and the seventh Step 700 compiles call stats(statistics) and sends the information to the database in main computer 10 via the link 50. After a call is completed, the novel program software updates each record with the result statistics (stats) of the call. The stats can include the disposition of the call (delivered to a live person or delivered to an answering machine), length of connect, the call status, the time of day, and the like.

Figure 3A:
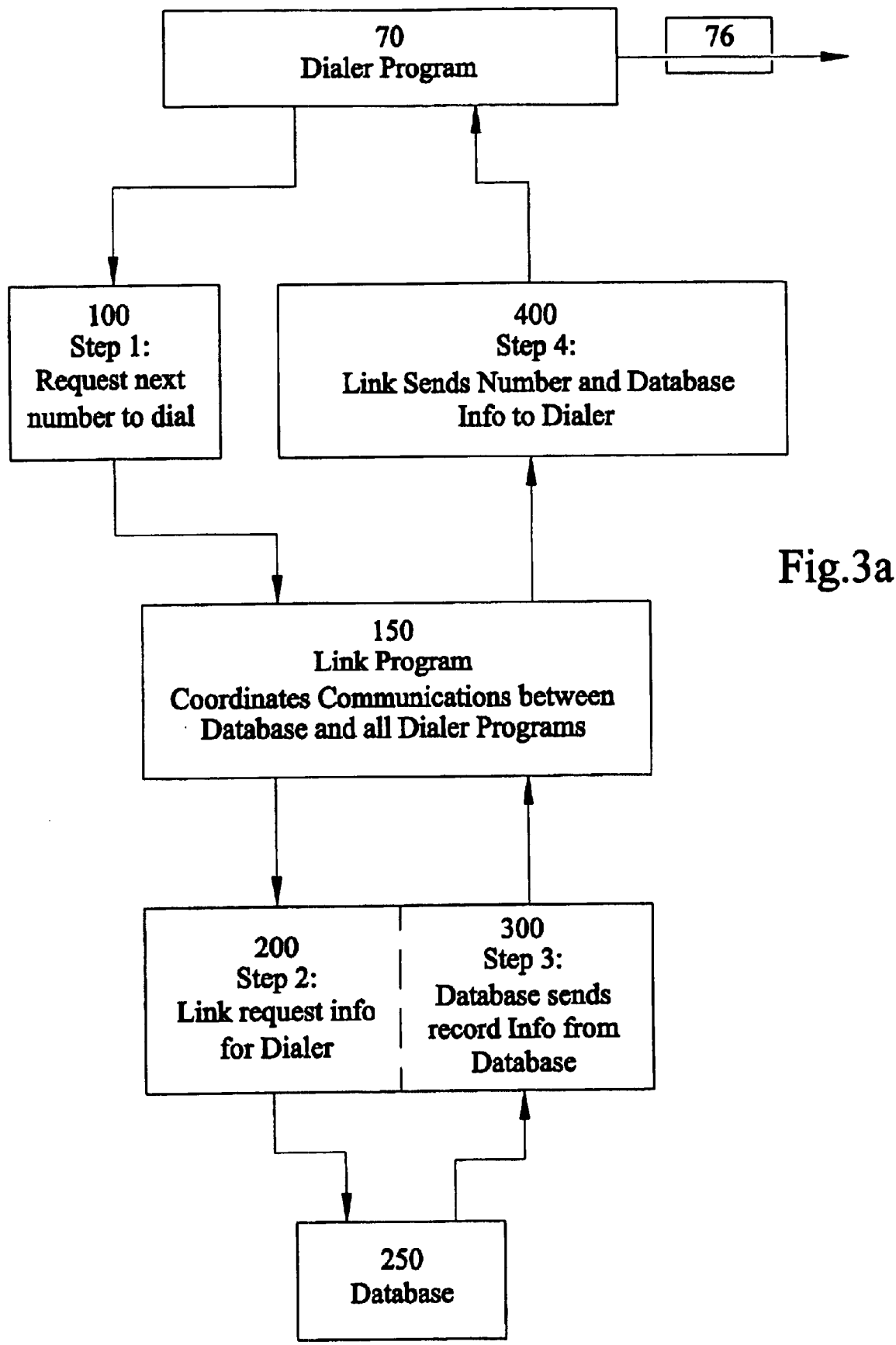
FIG. 3a, is a flowchart of the dialer program portion steps 1–4 of the novel telephone dialing software message delivery system invention of FIG. 2.
Figure 3B:
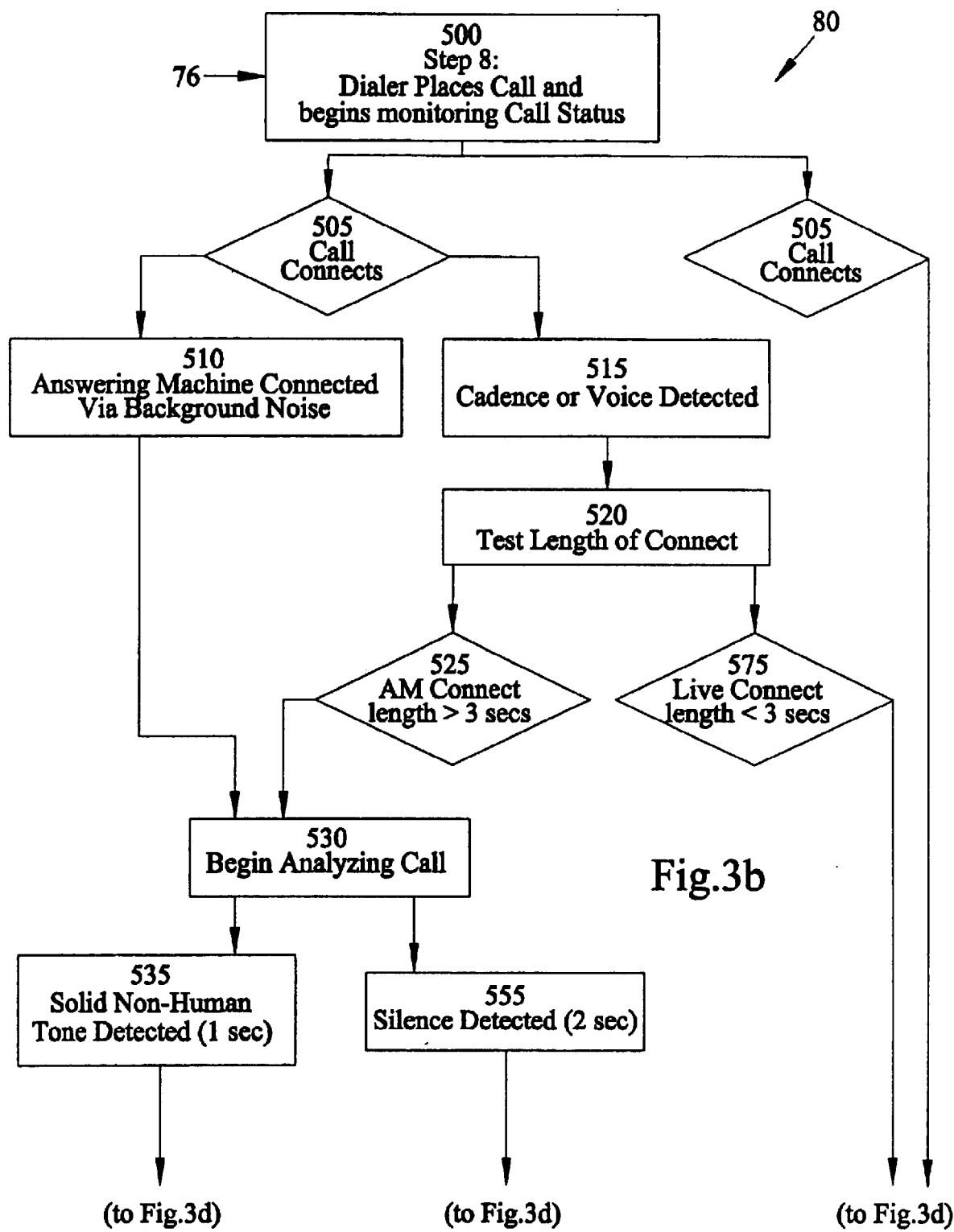
Figure 3C:
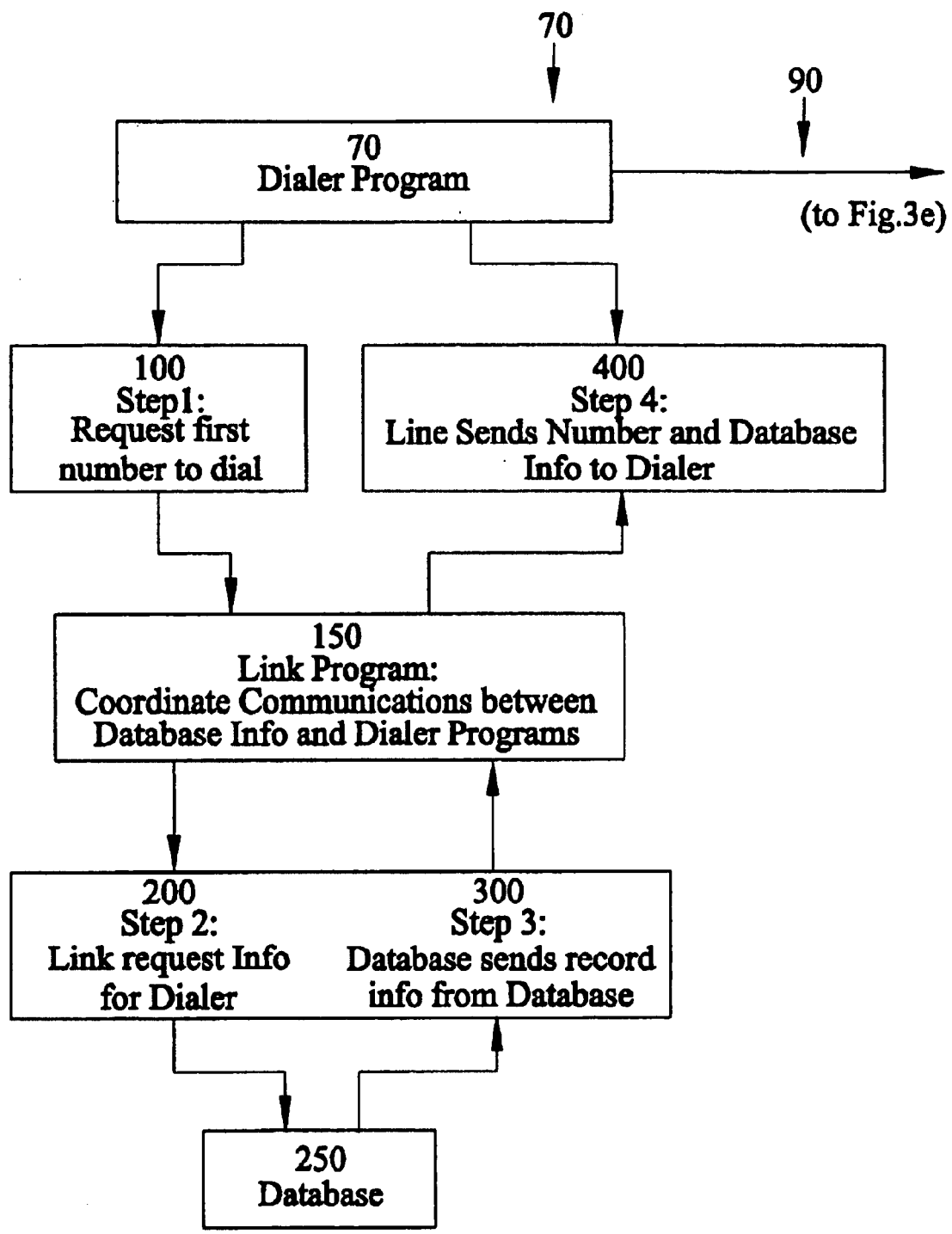
Figure 3E:
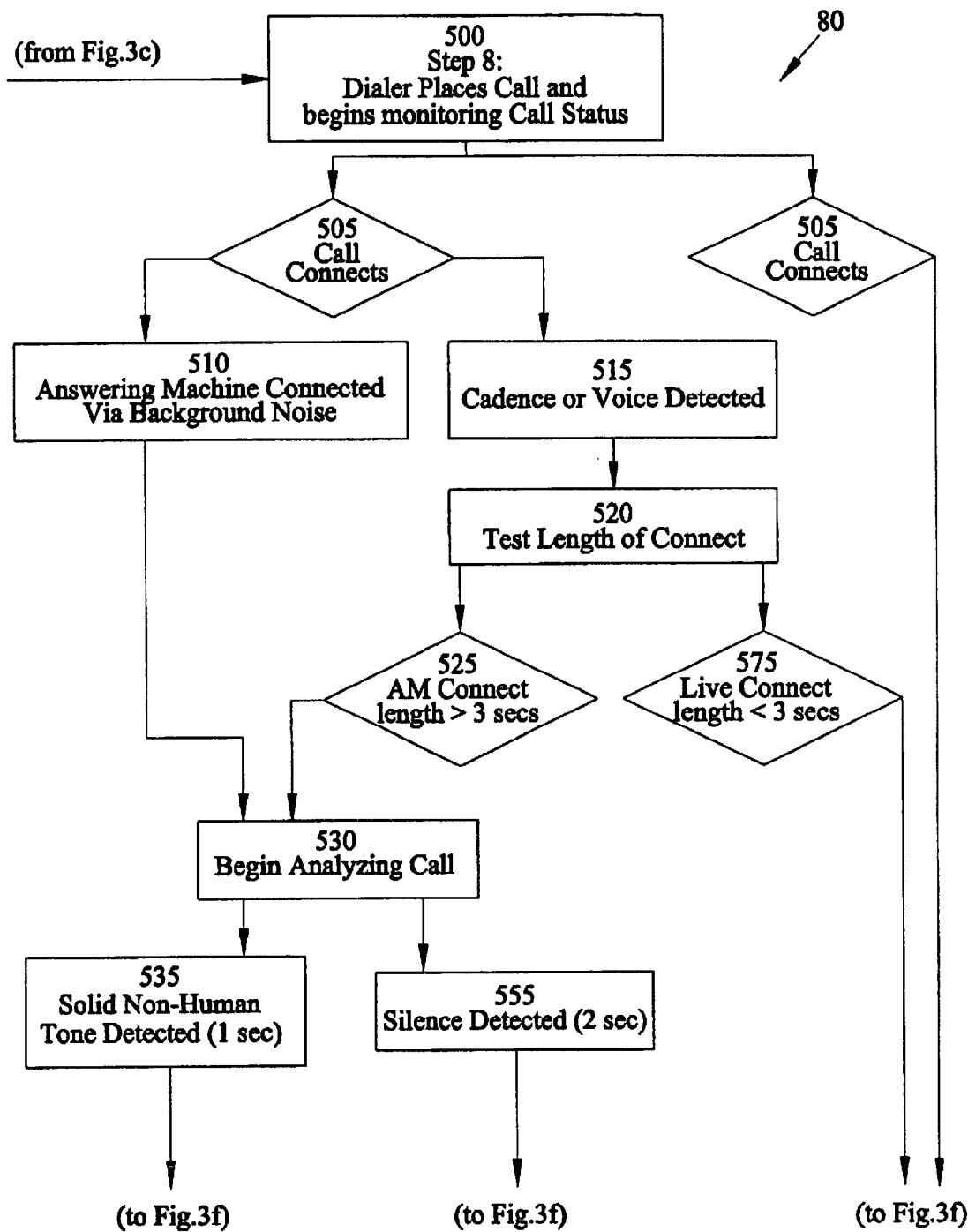

FIG. 3A is a flowchart 70 of the dialer program portion steps 1–4 of FIG. 2 of the novel telephone dialing software message delivery system invention of FIG. 2. FIG. 3B is a flowchart 80 of the dialer placing call and monitoring portion Steps 5–7 of FIG. 2 of the novel telephone dialing software message delivery system invention of FIG. 2, and will be explained in greater detail later. FIG. 3C is an overview of the entire flowchart process 90 of the novel telephone dialing software message delivery system invention of FIGS. 2 and 3A-3B. The subject matter of FIGS. 3A-3C further includes steps described in detail in reference to U.S. application Ser. No. 09/124,697 to the same assignee and inventor as the subject invention, incorporated by reference.

Referring to FIGS. 3A and 3C, the dialer program 70 initiates the first Step 100 which requests the next telephone number to dial and uses the Link program 150 to communicate to the second Step 200 which is the link request for information for the Dialer from the database 250. Third Step 300 has the Database 250 send record information to the Link program 150 to the fourth Step 400 which is a link process that sends the telephone and Database information from the Link program to the Dialer program 70 and to the flowchart shown in FIG. 3B. When the Dialer program 70 requests a new number to call, the Link program 150 sends the Dialer program 70 the following bits of data: a telephone number, the name of the recorded messages(s) to play once connected, and the unique number of the record. When the Dialer program 70 has completed a call it sends to the Link program 150 the following: recorded number of completed call, call length and the results of the call. The first five Steps 100, 200, 300, 400 and 500 of FIGS. 3A-3C take place in the main computer system 10 of FIG. 1.

FIG. 3B is a flowchart 80 of the dialer placing call and the novel monitoring portion Steps 5–7 of the telephone dialing software message delivery system invention of FIG. 2. FIG. 3C is an overview of the entire flowchart process 90 of the novel telephone dialing software message delivery system invention of FIGS. 2 and 3A-3B. Referring to FIGS. 3B-3C, the fifth Step 500 receives by line 76 the telephone number and database information from the dialer program 70 and a dialer places the call and begins monitoring the call status.

Two outputs can be the result of the fifth Step 500, either the call connects 505, or the dialed call doesn't conngect 595. Any call which does not result in the telephone being answered by either a live person or a telephone answering machine is considered a "Non Connect". Examples of non connected calls are those resulting in Busy, No answer, No Ring, Facsimile tones, and Operator Interrupts. If no connect, then the seventh Step 700 occurs where the system compiles the Call Stats and sends information to database 250 via link 150 and the line 800 prepares for the next call back to first Step 100.

Referring back FIGS. 3B and 3C, if a call connects either path 510 or 515 occurs which will now be explained in detail. Under 510 an answering machine can be detected via background noise. See U.S. Pat. No. 5,371,787 to Hamilton, which is incorporated by reference. The CT hardware (20 of FIG. 1) can detect an answering machine by analyzing the frequency of the background noise present in the called party's voice response and compares it to a profile of the background noise typical of recorded messages. If the hardware 20 determines the presence of an answering machine or in any other manner proprietary to the specific CT hardware, it communicates this information to the novel system (via the Custom control software) and the novel part of the Dialer program 70 responds. If the hardware 20 does not detect an answering machine via its' built in detection, then the software in the Dialer program 70 determines whether the call is connected to a live person or an answering machine by analyzing the length(time) of the cadence of the voice which answered the telephone. The typical voice cadence of a live person is much shorter than that of an answering machine. For example a live person answers the telephone generally in one of the following ways: "Hello?"(followed by silence), "Hello, Smith Residence"(followed by silence), "ABC Enterprises . . . how can I direct your call?"(followed by silence). In all of these cases, the spoken words occur for a very brief period of time (less than three seconds), followed by a period of silence. In the case of a typical answering machine, the length of continuous human sound prior to a period of silence is much greater. An example of a typical answering machine message is "Thank you for calling the Smith Residence, we're not home right now, but if you leave a message after the tone we will call you back as soon as we can. Thank you for calling, and have a great day"(followed by silence). After analyzing the cadence the RealCall invention will have determined whether the call has reached an answering machine or reached a live person. The novel software system will then proceed to take the appropriate action.

From the answering machine substep 510 shown in FIGS. 3B and 3C, the next substep is to begin analyzing the call 530. From analyzing call substep 530, either a solid, i.e. audibly distinct, non-human tone is detected after 1 second substep 535 or silence lasting 2 second is detected in substep 555.

Substeps 535 and 555 encompass an important part of the subject invention. In order to have reached step 530, the system must have determined it has reached an answering machine. The invention now must try to determine the appropriate time to launch the prerecorded message. To 'analyze' the call, the invention begins to RECORD the answering machine. The novel program only has instructions to stop recording under two conditions: (1) if it "hears" the presence of a solid, non human tone lasting at least one second in length(substep 535), or (2) it hears no sound for at least two continuous seconds(substep 555). A solid non human tone (substep 535) would be typical of a "BEEP" indicating that machines readiness to begin recording. However, since many answering machines play "BEEP" tones lasting less than one second, the two seconds of silence (substep 540) will act as a safety measure to insure that playback begins if the novel software does not recognize the "BEEP" indicator(substeps 540 and 560). Additionally, many answering machines play a succession of "beeps" to indicate the number of unplayed messages currently residing on the system. The $2^{nd}$ stage of continued analysis(substep 540) insures that the recording does not begin while the answering machine is still playing a series of "beep" tones.

During testing of the invention, simply identifying a "BEEP"(535) or two seconds of silence (555) does not indicate the moment when the answering machine begins recording with any high degree of accuracy. The reasons for the inaccuracy stems from many factors including: (1) machines which play multiple "BEEPS" before recording starts, (2) machines which play on-hold music (solid, non human tones) while preparing to record, (3) Outgoing messages (OGMs) which contain periods of silence after the end of the messages but prior to the announcing of a "beep" tone indicating the start of recording(this usually is the result of the owner of the answering machine who records their OGM and then cannot stop the recording immediately after recording their script).

In order to obtain a higher degree of accuracy as to the moment recording begins, the RealCall invention uses a dual alternative two step tiers. If the system had previously identified an initial "BEEP"(solid non-human noise (step 535)), the invention then begins re-recording the call, this time with instructions to end recording only after a period of two continual seconds of silence(substep 540). This logic believes that a "BEEP" or the playing of music has already occurred, and now the system is searching for the indication of recording, which will be evidence by silence. Consequently, if the first tier analysis terminated for the presence of two seconds of silence (substep 555), the second tier analysis will simply test for another period of at least one second of additional silence(substep 560) before launching. In this situation, the second tier search for additional silence eliminates false recording detection in situations where an OGM plays a period of silence prior to playing a "BEEP". Testing of the invention has determined that adding the second tier of analysis has increased overall accuracy in determining the proper moment to begin playback by over 75% over current systems described in the prior art section of this invention.

As mentioned above, from substep 535(in FIGS. 3B and 3C), the system continues analyzing the call until there is silence for 2 seconds substep 540. After which from substep 540, the sixth Step 600 occurs where the system plays the recorded information file message, followed by the system disconnects the call substep 650 and the seventh Step 700 where the system compiles Call Stats and sends information to database 250 via Link program 150 and substep 800 which prepares the system for the next telephone number and the first Step 100.

As previously mentioned, the other path from Begin Analyzing Call substep 530, is if silence is detected(2 sec) 555. From substep 555, the next substep is to Continue Analyzing Call Until Silence for 1 seconds, substep 560. From substep 560, the sixth Step 600 has the system play the recorded information file, followed by the system disconnect substep 650 and the seventh Step 700 where the system compiles Call Stats(previously described) and sends the Stats information to database 250 via Link program 150 and substep 800 which prepares the system for the next telephone number and the first Step 100.

Referring to FIGS. 3B-3C, the Call Connects 505 passes through substep 515 when cadence or voice is detected. Next the system tests the length of the connect, substep 520. If an AM(answering machine) Connect is indicated by cadence length greater than 3 seconds, substep 525, then the system begins analyzing the call to determine the appropriate time to play the message, substep 530, and the substeps 535 and 555 are checked as previously described. AM connect refers to Answering Machine Connect, or a call which has connected to an answering machine, as opposed to calls which are connected to live persons.

Referring to FIGS. 3B-3C, if the test length of connect identifies a Live Connect as indicated by cadence length of less than 3 seconds substep 575, then the system goes to the sixth Step 600 where the system plays the recorded information message immediately and so forth as previously described.

FIG. 4 shows an exemplary output Recap form of the invention.

Second Embodiment

Figure 5A:
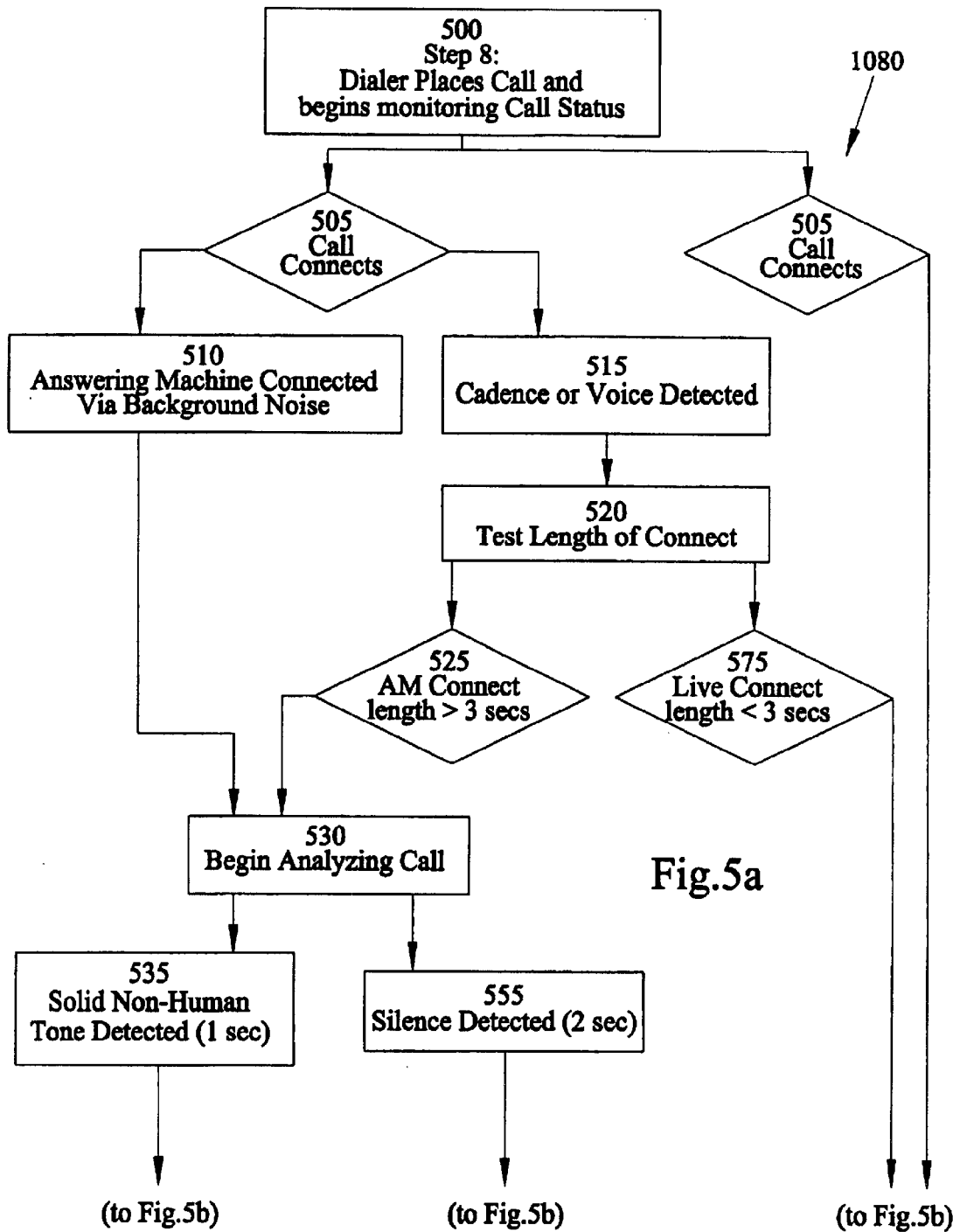

FIG. 5 is a second embodiment flowchart of modifying the play the recording step 6, at 600 of the first embodiment for personalizing a pre-face message to the pre-recorded message as shown at 602 of second embodiment flow chart 1080 of the dialer placing call and monitoring portion steps 5–7 of the message delivery system invention of FIG. 2 for personalizing the pre-recorded messages. FIG. 5 shows an alternative step 6 to that depicted in FIG. 3B. New step 6 has two preliminary steps 610 and 620 before playing the generic pre-recorded message of 600. Referring to FIG. 5, step 610, compares the first name of the caller being called(FName) to a database index of recorded first names (Recorded First Name Index), and determines if the FName exists in the database(Fname.vox). Under step 620, if Fname.vox exists, in the database, then the invention plays out the greeting associated with Fname.vox onto the answering machine. After the personalized greeting is played, the generic pre-recorded message of step 600 is then played onto the answering machine followed by step 690, where upon completion of the call, or termination by the called party hanging up, step7 at 700 and the remaining steps 150, 250 and 800 are completed. If there is no Fname.vox in the pre-recorded database at step 610, the invention system skips to step 600 and plays the generic pre-recorded message onto the answering machine, followed by step 690, 700, 150, 250 and 800 as previously described.

Figure 6:
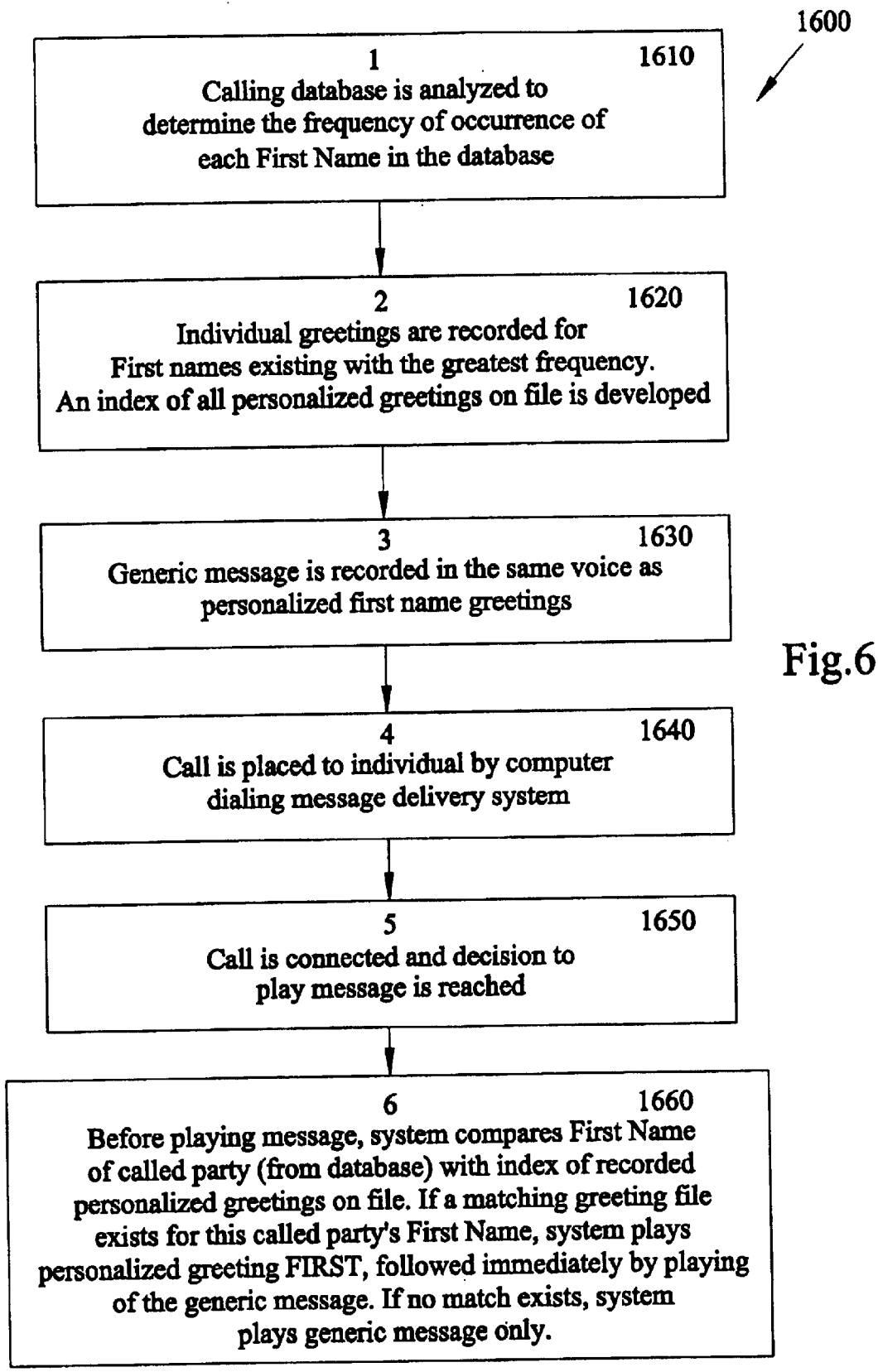
FIG. 6 shows the six sub-step flowchart for the novel for the personalized pre-face message step of FIG. 5.

FIG. 6 shows the six sub-step flowchart 1600 for the novel for the personalized pre-face message step of FIG. 5. Personalized prefacing is used to enhance prerecorded message delivery systems such as the RealCall message delivery system shown an described in the first embodiment, as well other computerized prerecorded message delivery systems. Personalized prefacing allows each prerecorded message to be initiated with a personalized greeting such as but not limited to "Hello Bill . . . . " Followed by a generic pre-recorded message recorded in the same voice as the personalized greeting. When used in conjunction with the RealCall embodiment or other systems capable of delivering and leaving recorded messages on answering machines, the personalized preface invention enhances the perception by the call recipient that the message was left by a live person, instead of by a computer.

Under the first substep 1, 1610, a calling database is analyzed to determine the frequency of occurrence of each First Name in the database (i.e. the number of "Toms", "Richards" and "Harrys", and the like). A database of call recipients that are selected to receive the pre-recorded message is analyzed to determine a listing containing the frequency of occurrence of all unique "first" existing within the database.

This tabulation is then "indexed" in descending order of frequency of occurrence(highest frequency of occurrence first, or "on top").

The number of unique first names existing in typical large database files of consumers in the United States can be greater than 5,000. (Large files are described as those containing 25,000 records or more). The subject inventors have determined it would probably be impractical and cost prohibitive for companies who utilize the personalized prefacing invention to record a personal greeting for all 5,000+ unique first names, which can exist in their targeting database. By identifying the most frequently occurring first names in the file, users of this invention can choose to limit the number of delivered personalized preface recordings to only the most popular names in the calling database. For example, in a typical 25,000 name database of United States residents, the inventors have discovered that the 25 names existing with the greatest frequency occur in nearly 20% of all database records! Therefore, by only recording 25 personalized preface greetings a user of this invention can deliver a personalized greeting to approximately 20% of their databases' call recipients, as shown in Table 1 below.

TABLE 1.

Typical First Name Occurrences in Database of 25,000 Records of Names

Total Quantity of Unique First Names 5,775

| Quantity of TOP Indexing Names | Combined Percentage Of Occurrence In File |
|---|---|
| 25 | 18.92% |
| 50 | 27.44% |
| 500 | 68.66% |
| 1000 | 78.79% |
| 5000 | 97% |

As one can see from Table 1, by recording 500 personalized preface greetings a user of this invention can deliver personalized greetings to approximately 68.66% of their customers in a 25,000 name calling database. Thus, the top 500 number of occurring names in the 25,000 name file encompass over two thirds of all the first names in the 25,000 database. Furthermore, Table 1, shows there is a point of diminishing returns from going from 500 to 1000 greetings, only increases personalized greetings up to approximately 78.79% and so on.

Referring to FIG. 6, under the next substep 1620, a unique greeting is recorded for each of the chosen first names existing at the "top" i.e. the name having the highest occurrence of the index file.

Prior to beginning the recording, the user must decide what percentage of calls are to receive a personalized preface greeting during the call out campaign. Once the percentage has been decided, a determination is made as to the exact number of top indexing first name greetings are to be recorded.

The personal greetings should be recorded using the same human voice that records the generic information message being delivered to the call recipients, so that the two messages (the preface and the generic message) can later be seamlessly merged by the system into what appears as one continuous personalized message.

A personalized greeting to each unique selected first name within the database is digitally recorded and saved for later retrieval. Example, the preface recorded file for first name "Mary" would be digitally recorded as "Hello Mary" and saved as "Mary.vox".

Under substep 1630 in FIG. 6, once all of the first name files have been created and stored, the generic message is recorded in the same voice as that of the preface personal greeting. While there may be dozens, hundreds or even thousands of personalized recorded greetings, there will typically be only one (or sometimes several) generic message recorded. An example of the generic message without a greeting is "This is John Smith from the cable company. I was calling to let you know that HBO® will be available to you for free this weekend on channel 14 during HBO's® free preview weekend. So enjoy all the free movies this weekend, and if you have any questions, please call me at 1-800-123-4567. Thank you."

Under substep 1640 of FIG. 6, calls are now placed to individuals by the computer dialing message delivery system, so that now the call out campaign is initiated to all records in the database of call recipients.

Under substep 1650 of FIG. 6, a call is connected and a decision to play the message is reached. Once the message delivery system has been determined that it has been connected to the called party, the call out system makes a determination to play the recorded message(s). It is important to note that since the methods used by the computerized telephone dialing equipment vary for determining the exact moment to play a recorded message that once a connection has been made, the method for determining the moment to "launch" a message is not necessary to make this embodiment work. For example, the RealCall message delivery system of the parent application and as covered in the first embodiment encompasses a unique method of delivering recorded messages in their entirety onto voice answering machines. The RealCall system can implement this invention embodiment at a point in the call processing when the RealCall system is ready to play the generic message onto an answering machine. Likewise, other message delivery systems which deliver to live call recipients as well as answering machines can also implement this invention by adding the personalized preface routines prior to beginning message playback.

Under substep 1660 of FIG. 6, just prior to playing the generic recorded message the call out system will compare the first name of the customer with whom the system has connected to the index of all recorded first name files. For example, if the connected call was placed to "Mary Smith" the call out program will check for the existence of a preface file names "Mary.vox" containing the recorded greeting "Hi Mary". If the file "Mary.vox" exists the call out system will play the "Hi Mary" message first and then, immediately upon completion of playback of the "Mary.vox" greeting, the system will then play the recorded generic message.

An example of a generic message is "This is Jim Smith from ABC Company. Please call me at 1-800-123-4567. Thank you". The combined preface (greeting) message and RealCall(generic) message would be "Hello Mary. This is Jim Smith from ABC Company. Please call me at 1-800-123-4567. Thank you". Note the period(.) between "Hello Mary" and "This is Jim . . . . "

An example of a personalized preface greeting is "Hi Mary".

An example of the combined sequential playback of greeting and message would be "Hi Mary, This is Jim Smith from ABC Company. Please call me at 1-800-123-4567. Thank you". Then the combined preface and RealCall message would sound like "Hello Mary. This is Jim Smith from ABC Company. Please call me at 1-800-123-4567. Thank you".

If the invention does not find a matching first name preface file for a specific customer, then the program simply launches the generic message without the personalized greeting and thus works with live persons receiving the call as well as with machines.

Although the preferred embodiment described under embodiment two above encompasses sending the combined personalized preface greeting and generic message to answering machines, the invention can be used with applications where the call recipient does not have an answering machine, but instead picks up their phone live.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An automated method of delivering a recorded personalized information message via an automated dialing system to automated recorders, comprising the steps of:
   (a) forming a database of first names and telephone numbers associated with the first names;
   (b) determining the greatest frequency of occurrence of of the first names in the database;
   (c) recording individual personal greetings to the first names having the greatest frequency of occurrence;
   (d) placing a call to a telephone number selected from the database and receiving a response;
   (e) determining if the response is from an answering machine signal;
   (f) playing the individualized personal greeting onto the answering machine, wherein each of the individualized personal greetings is delivered once in a nontruncated form; and
   (g) repeating steps (d), (e) and (f) until at least a single pass through of all the telephone numbers associated to the first names having the greatest frequency of occurrence have been called.

2. The automated method of delivering the recorded personalized information message of claim 1, wherein the database is approximately 10 to approximately 100,000 first names.

3. The automated method of delivering the recorded personalized information message of claim 1, wherein the determining step further includes:
   determining the occurrence of approximately $\frac{2}{3}$ of all the commonly occurring first names in the database.

4. The automated method of delivering the recorded personalized information message of claim 1, wherein the step of playing further includes:
   playing a generic information message immediately after the individualized
   personal greeting onto the answering machine.

5. The automated method of delivering the recorded personalized information message of claim 4, wherein the individualized personal greeting and the generic information message are from an identical voice.

\* \* \* \* \*